March 19, 1929.  H. S. LEWIS ET AL  1,705,931
GEAR WHEEL
Filed Jan. 11, 1928
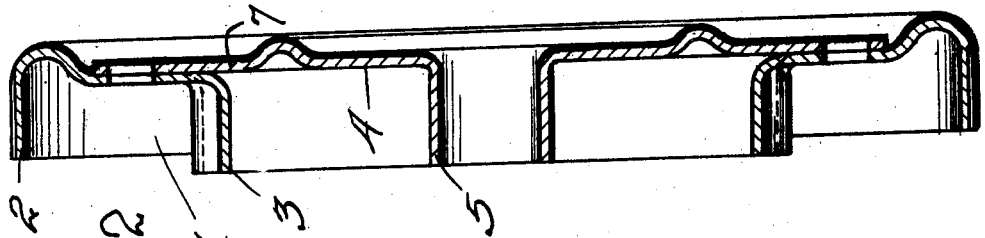
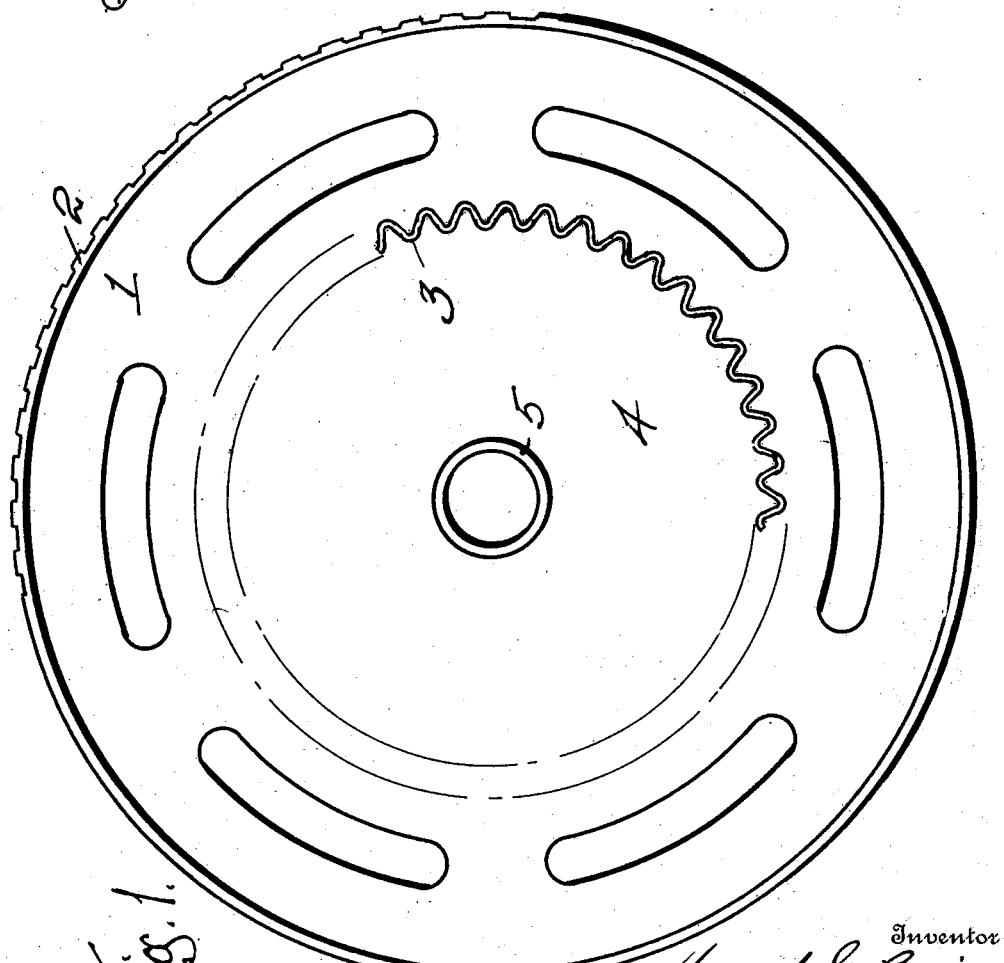

Patented Mar. 19, 1929.

1,705,931

UNITED STATES PATENT OFFICE.

HOWARD S. LEWIS AND CHARLES KACHEL, OF READING, PENNSYLVANIA, ASSIGNORS TO PARISH PRESSED STEEL COMPANY, OF READING, PENNSYLVANIA, A CORPORATION OF DELAWARE.

GEAR WHEEL.

Application filed January 11, 1928. Serial No. 245,963.

This invention relates to improvements in gear wheels, and it pertains particularly to the construction of wheels for use on lawn mowers, in which a toothed inner surface is required to accommodate a co-acting and rotatable member of the machine.

The invention contemplates a lawn mower wheel on which the machine is to be mounted for operation, made of sheet metal, preferably sheet steel, and in which such geared surface is conveniently provided.

To this end we have devised a wheel, pressed from sheet steel, consisting of two members firmly fixed together, and in which the tread or outer member is formed with a flange, and the inner member with a flange, the first serving as a wheel tread and the latter as a wheel hub, while the outer member is provided with an additional flange, which is formed with teeth, thus providing the geared surface referred to.

The invention is more fully described in the following specification and clearly illustrated in the accompanying drawing, in which:—

Figure 1 is an elevational view showing the inner side of the wheel.

Figure 2 is a central cross-section through Figure 1.

The numeral 1 designates the outer member and is formed with two inwardly pressed flanges, the one forming the tread, 2, of the wheel, which is suitably serrated, and the other flange, 3 forming the surface in which the gear teeth are pressed.

The numeral 4 designates the inner member, and this is formed with an inwardly projecting flange, 5 forming the hub of the wheel, and the flat or body portion 7 of a diameter, slightly less than that of the outer member 1.

The two members, when placed into position with relation to each other, as shown in Figure 2, are then fixed together by spot welding, at a plurality of points when the surfaces of the two members contact.

It will be understood that both the inner and outer wheel members are pressed from sheet steel, in the form shown in the accompanying drawings, and they are then fixed securely together to form, as a unitary structure, a light weight, indestructible, internally geared lawn mower wheel.

Having thus fully described our invention, what we claim and desire to secure by Letters Patent is:—

1. A sheet metal, internally geared lawn mower wheel, comprising an outer member formed with two inwardly projecting flanges, one of which has gear teeth pressed into it and the other forming the wheel tread, and an inner member of substantially circular form, having an inwardly projecting flange which forms the wheel hub, and firmly attached to the outer member to form a unitary structure.

2. A lawn mower wheel, made from two sheets of steel, pressed into annular form, one sheet having two inwardly projecting flanges, the one to form the tread of the wheel and the other to provide an internal geared surface for the wheel, the other sheet having a single inwardly projecting flange to form the wheel hub, and the two sheets welded together to form a unitary structure.

In testimony whereof we affix our signatures.

HOWARD S. LEWIS.
CHARLES KACHEL.